United States Patent
Wenker (10) Patent No.: US 11,543,039 B2
(45) Date of Patent: Jan. 3, 2023

(54) SELECTOR CONTROL VALVE

(71) Applicant: Parker-Hannifin Corporation, Cleveland, OH (US)

(72) Inventor: Dennis Wenker, Woodbury, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 967 days.

(21) Appl. No.: 16/332,595

(22) PCT Filed: Sep. 27, 2017

(86) PCT No.: PCT/US2017/053686
§ 371 (c)(1),
(2) Date: Mar. 12, 2019

(87) PCT Pub. No.: WO2018/064148
PCT Pub. Date: Apr. 5, 2018

(65) Prior Publication Data
US 2021/0285467 A1    Sep. 16, 2021

Related U.S. Application Data (60) Provisional application No. 62/400,877, filed on Sep. 28, 2016.

(51) Int. Cl.
*F16K 11/07* (2006.01)
*F16K 35/04* (2006.01)

(52) U.S. Cl.
CPC .......... *F16K 11/0704* (2013.01); *F16K 35/04* (2013.01)

(58) Field of Classification Search
CPC ...... F16K 11/0704; F16K 11/07; F16K 35/04; Y10T 137/86485
(Continued)

(56) References Cited

U.S. PATENT DOCUMENTS 3,128,677 A    4/1964   Tennis
3,373,843 A    3/1968   Schmiel et al.
(Continued)

OTHER PUBLICATIONS

International Search Report and Written Opinion for corresponding International Application No. PCT/US2017/053686 dated Dec. 15, 2017.

*Primary Examiner* — Kelsey E Cary
(74) *Attorney, Agent, or Firm* — Renner, Otto, Boisselle & Sklar, LLP (57) ABSTRACT

A selector control that is manually operable by a user for activating or deactivating a primary control or a secondary control. The selector control may include a first state for activating the primary control and deactivating the secondary control, a second state for activating the secondary control and deactivating the primary control, and a failsafe state for deactivating both the primary control and the secondary control. The selector control may be configured to maintain the second state independent of continuous user input being applied to the selector control, and configured to maintain the first state when continuous user input is applied to the selector control. The selector control is normally biased toward the failsafe state such that the selector control automatically selects the failsafe state when the user discontinues applying the user input for maintaining the first state. The selector control has particular application for use in controlling a boom of a work vehicle.

19 Claims, 8 Drawing Sheets

(58) Field of Classification Search
USPC .................................................. 137/624.27
See application file for complete search history.

(56) References Cited

U.S. PATENT DOCUMENTS

| | | | | |
|---|---|---|---|---|
| 3,790,129 | A | * | 2/1974 | Pauls .................... F15B 15/261 |
| | | | | 251/297 |
| 3,866,880 | A | * | 2/1975 | Schexnayder ...... F16K 11/0704 |
| | | | | 251/297 |
| 4,098,371 | A | | 7/1978 | Cox |
| 4,185,427 | A | | 1/1980 | Raymond |
| 4,265,144 | A | * | 5/1981 | Clark ...................... F16D 48/02 |
| | | | | 137/625.69 |
| 2015/0013804 | A1 | | 1/2015 | Pieper |
| 2015/0316079 | A1 | | 11/2015 | Guarino et al. |

* cited by examiner

FIG. 8

SELECTOR CONTROL VALVE

RELATED APPLICATIONS

This application is a national phase of International Application No. PCT/US2017/053686 filed Sep. 27, 2017 and published in the English language, which claims the benefit of U.S. Provisional Application No. 62/400,877 filed Sep. 28, 2016, all of which are hereby incorporated herein by reference in their entireties.

FIELD OF INVENTION

The present invention relates generally to a fluid flow control device, and more particularly to a selector control that directs fluid flow in response to an input command, particularly for use in operating a boom of a work vehicle.

BACKGROUND

A boom-type apparatus, such as an aerial work platform or mobile elevating work platform, is commonly used in industrial, construction, maintenance, repair, emergency, and other applications. Such a boom-type apparatus typically includes a lower boom mounted on a vehicle for swinging about one or more axes, and an upper boom that is extendable from the lower boom or which is pivotally connected to the lower boom for also swinging about one or more axes. The upper boom typically has a bucket or platform connected at its distal end for enabling a worker to perform one or more tasks at a normally inaccessible area, which is usually at an elevated position.

Such a boom-type apparatus typically includes at least two working control valves for controlling one or more functions of the boom. A primary working control valve is usually disposed at the proximal end of the boom, such as in a cab of the vehicle, and may be used to control the boom from the ground. A secondary working control valve is usually disposed at the distal end of the boom, such as in the aerial bucket, and may be used to control the boom from the elevated position. In addition, a selector control valve is also typically disposed at the proximal end of the boom, and is used to operably couple either the primary working control valve or the secondary control valve for enabling operation of the boom. Such control valves may be hydraulic directional control valves, which are well-known in the art, and which may be operated by an external input command, such as a lever or joy stick that is operable by a human operator.

The ability to control the boom from the ground enhances the utility of the boom-type apparatus, however, the worker supported by the aerial platform may be hindered if the primary control functions remain active and are accidentally engaged to allow the platform to rotate, tilt, lift, or the like. Known selector control valves of the type described above typically prevent such accidental operation of the primary control valve by providing an emergency or failsafe state that must be actively selected by the operator to decouple the primary control. For example, such known selector control valves typically include a detent mechanism having detent positions that correspond to activation of each of the primary control, the secondary control, and the failsafe state. However, requiring the user to actively select the failsafe detent position among the various detent positions may lead to mistakes or user error, which may allow the primary control to remain activated, and which may lead to undesirable results if the primary control functions are accidentally engaged.

SUMMARY OF INVENTION

The present invention provides, inter alia, an improved selector control that automatically selects a failsafe state for deactivating a working control. More particularly, the selector control may be configured to activate the working control while continuous user input is applied to the selector control, and the selector control automatically selects the failsafe state when the user discontinues applying the input for maintaining activation of the working control. The invention has particular application for controlling a boom of a work vehicle.

Such a configuration of the selector control to automatically select the failsafe state is advantageous in that the operator actively selects and continuously maintains input to the selector control before allowing operation of the machinery with the working control. For example, in the context of operating a boom, such a selector control may help to prevent the working control from being accidentally activated and engaged, which could interfere with a worker on a platform at the distal end of the boom.

According to one aspect of the invention, the selector control may be manually operable by a user for activating or deactivating a primary working control or a secondary working control. The selector control may include a first state for activating the primary control and deactivating the secondary control, a second state for activating the secondary control and deactivating the primary control, and a failsafe state for deactivating both the primary control and the secondary control. The selector control may be configured to maintain the first state when continuous user input is applied to the selector control. The selector control is normally biased toward the failsafe state such that the selector control automatically selects the failsafe state when the user discontinues applying the user input for maintaining the first state.

According to another aspect of the invention, a selector control may be operable by a user for selectively fluidly coupling a fluid flow source with a primary control or a secondary control, where the selector control includes: (i) a first state for selectively fluidly coupling the primary control with the fluid flow source and decoupling the secondary control from the fluid flow source, (ii) a second state for selectively fluidly coupling the secondary control with the fluid flow source and decoupling the primary control from the fluid flow source, and (iii) a failsafe state for decoupling both the primary control and the secondary control from the fluid flow source.

The selector control may be manually operable by applying a user input to select the first state or the second state. The selector control may be configured to maintain the second state independent of continuous user input being applied to the selector control, and may be configured to maintain the first state when continuous user input is applied to the selector control. The selector control is normally biased toward the failsafe state such that the selector control automatically selects the failsafe state when the user discontinues applying the user input for maintaining the first state.

Embodiments of the invention may include one or more of the following additional features separately or in combination.

For example, the secondary control may be remote from the primary control.

The secondary control may be disposed at a distal end of a boom, and the primary control may be disposed at a proximal end of the boom, the primary and secondary controls being coupleable to the fluid flow source to control one or more functions of the boom.

The selector control may be disposed proximal the primary control, such that the user is capable of continuously applying an input to the selector control with one hand to maintain the first state for enabling operation of the primary control, and the user is capable of applying an input to the primary control with the other hand to control one or more functions of the boom.

The selector control may be normally biased toward the failsafe state such that the selector control may automatically select the failsafe state when the user applies an input to exit the second state.

The selector control may be a selector control valve assembly, the primary control may be a primary working valve assembly, and the secondary control may be a secondary working valve assembly.

The selector control valve assembly may include a valve body having a fluid flow path for enabling fluid to flow to the primary working valve assembly, the secondary working valve assembly, or a fluid return line. The selector control valve assembly may also include a main control valve extending through at least a portion of the valve body and being manually movable in the fluid flow path relative to the valve body for directing fluid flow based on a position of the main control valve within the valve body.

The first state may correspond to a first position of the main control valve for directing fluid flow to the primary working valve assembly.

The second state may correspond to a second position of the main control valve for directing fluid flow to the secondary working valve assembly.

The failsafe state may correspond to a failsafe position of the main control valve for directing fluid flow to the fluid return line.

The selector control valve assembly may further include a selector mechanism operatively coupled to the main control valve, the selector mechanism being configured to maintain the main control valve in the second position independent of the user continuously applying user input to the main control valve, and being configured to maintain the first position when the user continuously applies user input to the main control valve.

The selector mechanism may be configured to bias the main control valve toward the failsafe position such that the main control valve automatically moves to the failsafe position when the user discontinues applying the user input to maintain the first position.

The selector mechanism may be configured to bias the main control valve toward the failsafe position such that the main control valve automatically moves to the failsafe position when the user applies an input to exit the second position. The selector mechanism may include a detent mechanism, the detent mechanism including a detent sleeve having at least one detent groove, the at least one detent groove being configured to receive a corresponding detent member.

The at least one detent groove may include a first detent groove, and the detent mechanism may be configured to maintain the main control valve in the second position when the detent member is received in the first detent groove.

The detent sleeve may include an abutment surface configured to engage the detent member when the main control valve is in the first position, the abutment surface being configured to enable the user to sense the main control valve being positioned in the first position.

The abutment surface may be interposed between the at least one detent groove corresponding to the second position and a position along the detent sleeve corresponding to the failsafe position.

The detent sleeve may be devoid of a detent groove interposed between the abutment surface and the position along the detent sleeve corresponding to the failsafe position for enabling the main control valve to move freely to the failsafe position.

The detent sleeve may have a radially inner surface forming an internal bore, and the radially inner surface may define the at least one detent groove and the abutment surface within the internal bore.

The detent mechanism may include a detent holder slidably movable in the internal bore.

The detent holder may be operatively connected to an axial end of the main control valve for common movement therewith.

The detent holder may include a detent biasing member and a cam, wherein the detent biasing member may be configured to urge the cam against the detent member for urging the detent member radially outwardly toward the sleeve inner surface.

The selector mechanism may further include a main biasing spring configured to bias the main control valve toward the failsafe position.

The user input is applied through a lever operatively coupled to the main control valve.

The main control valve may be a main valve spool slidably disposed in the valve body, the main valve spool having a plurality of spool lands configured to cooperate with corresponding valve body lands for selectively directing fluid flow through the valve body.

According to another aspect of the invention, a selector control valve assembly that is operable by a user for selectively directing pressurized fluid to a primary working valve assembly, a secondary working valve assembly, or a fluid return line, the selector control valve assembly comprising: a valve body having a fluid flow path for enabling fluid to flow to the primary working valve assembly, the secondary working valve assembly, or the fluid return line; a main control valve extending through at least a portion of the valve body and being movable in the fluid flow path relative to the valve body for directing fluid flow based on a position of the main control valve within the valve body, the main control valve being manually movable by applying a user input to select a first position for directing fluid flow to the primary working valve assembly, or to select a second position for directing fluid flow to the secondary working valve assembly; and a selector mechanism operatively coupled to the main control valve, the selector mechanism being configured to maintain the main control valve in the second position independent of the user continuously applying user input to the main control valve, and being configured to maintain the first position when the user continuously applies user input to the main control valve; wherein the selector mechanism is configured to bias the main control valve toward a failsafe position for directing fluid flow to the fluid return line and decoupling both the primary and secondary working valve assemblies, the selector mechanism being configured to automatically move the main control valve to the failsafe position when the user discontinues applying the user input to maintain the first position.

In some embodiments, the selector mechanism may be configured to bias the main control valve toward the failsafe position such that the main control valve automatically moves to the failsafe position when the user applies an input to disengage from the second position.

According to another aspect of the invention, a selector control valve assembly, for selectively directing pressurized fluid to at least one working valve assembly, includes: a valve body having a fluid flow path for enabling fluid to flow to the at least one working valve assembly; a main control valve extending through at least a portion of the valve body and being movable in the fluid flow path relative to the valve body for directing fluid flow based on a position of the main control valve within the valve body, the main control valve being operable to select a working position for directing fluid flow to the at least one working valve assembly; and a selector mechanism operatively coupled to the main control valve, the selector mechanism including a detent sleeve having at least one detent groove that is configured to securably receive a detent member when the main control valve is in the working position; wherein the selector mechanism includes a biasing device configured to move the main control valve toward a failsafe position for decoupling the at least one working valve assembly from fluid flow when the detent member is not securably received in the detent groove.

According to another aspect of the invention, a method of operating a boom having a primary control at a proximal end of the boom and a secondary control at a distal end of the boom, includes: (i) operating the primary control, including: (a) manually selecting a first state of a selector control by continuously applying a user input such that the selector control fluidly couples a fluid flow source with the primary control, the selector control being biased toward a failsafe state for decoupling both the primary control and the secondary control, whereby the selector control automatically selects the failsafe state when the user discontinues applying the user input for selecting the first state; and (b) while the user continuously applies the user input to select the first state, manually controlling the primary control to operate one or more functions of the boom; or (ii) operating the secondary control, including: (a) manually selecting a second state of the selector control by applying a user input such that the selector control fluidly couples a fluid flow source with the secondary control, the selector control being configured to maintain the second state independent of the user input being continuously applied to the selector control; and (b) manually controlling the secondary control to operate one or more functions of the boom.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles of the present invention have particular application to hydraulic control valves for controlling one or more functions of a boom, and thus will be described below chiefly in this context. It is also understood, however, that the principles of this invention may be applicable to other fluid circuits in other applications where it is desirable to selectively control fluid flow while providing a failsafe state that may be automatically selected to deactivate a working control, such as when an operator is no longer applying an input to maintain operation of the working control.

Figure 1:
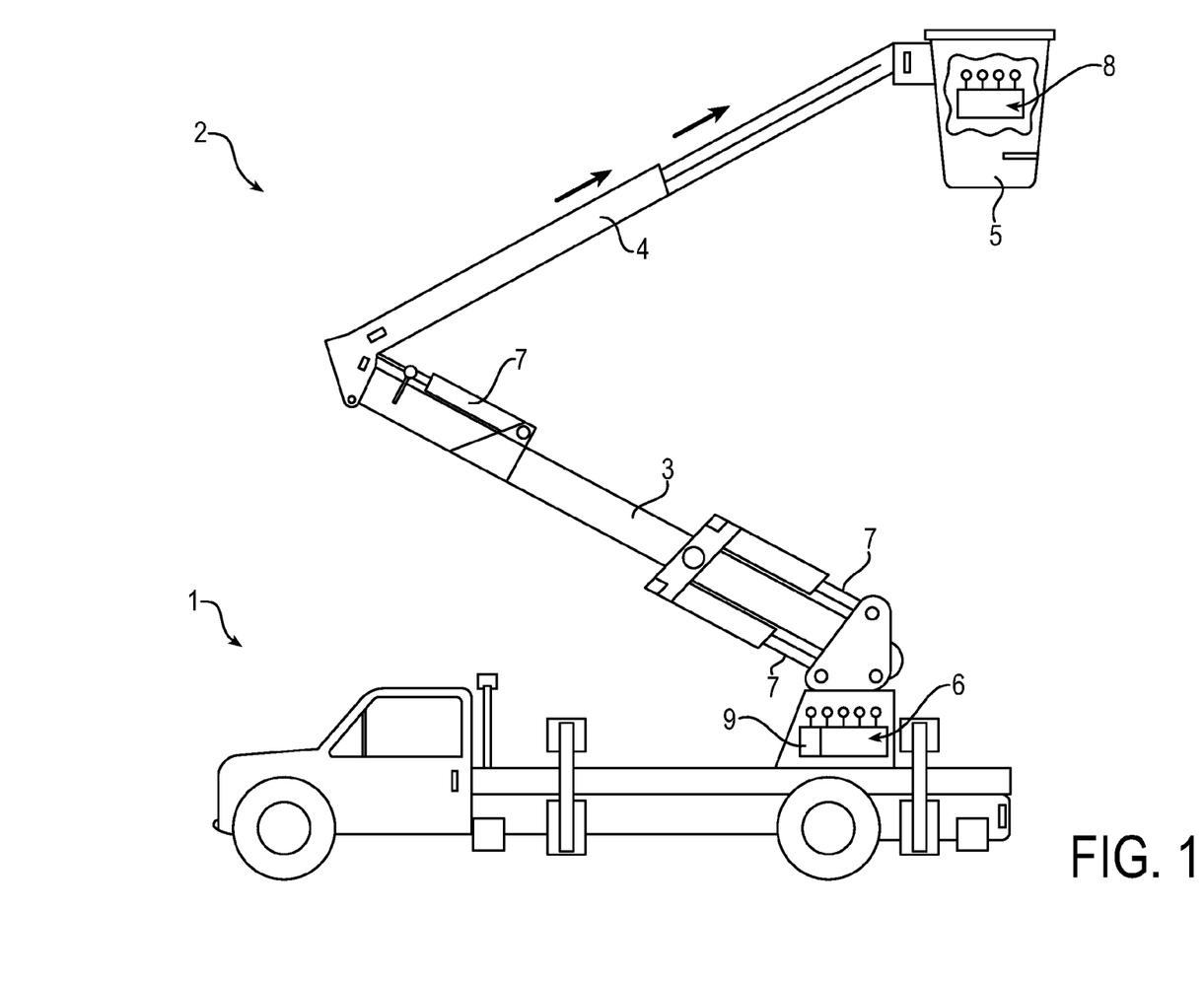
FIG. 1 is a perspective view of a vehicle having a boom mounted thereon, including an exemplary primary control, a secondary control, and a selector control in accordance with an embodiment of the invention.

Turning to FIG. 1, an exemplary vehicle 1 having a boom assembly 2, or boom, mounted thereon is shown. The boom assembly 2 may include a lower boom 3 and an upper boom 4. The lower boom 3 may be mounted to the vehicle 1 about a pivot point for swinging about one or more axes, and the upper boom 4 may be extendable from the lower boom 3 and/or may be pivotally connected to the lower boom 3 for also swinging about one or more axes. The upper boom 4 may include a bucket 5 or platform connected at its distal end for enabling a worker to perform one or more tasks at a normally inaccessible area, such as at an elevated position.

The boom assembly 2 may be operable by controlling one or more working controls, such as a primary control 6, which may direct fluid flow from a fluid flow source or fluid pressure source (shown in FIG. 3) to one or more actuators 7 or other fluid receiving devices so as to control one or more functions of the boom. As shown, the primary working control 6 may be disposed at the proximal end of the boom 2, such as in a bed or cab of the vehicle 1, and may be used to control the boom from the ground. A secondary working control 8 also may be provided to control one more functions of the boom 2. The secondary working control 8 may be substantially similar to the primary working control 6, but is usually disposed at the distal end of the boom 2, such as in the aerial bucket 5, so as to enable control of the boom from the elevated position. In addition, an exemplary selector control 9 is provided to operably couple either the primary working control 6 or the secondary working control 8 for enabling operation of the boom. As shown, the selector control 9 may be disposed at the proximal end of the boom and may be used simultaneously in conjunction with primary control 6, as will be discussed in further detail below.

It is understood that the vehicle 1 and boom 2 are shown and described to facilitate an understanding of the invention and not by way of limitation. As will be appreciated, the vehicle with boom are just one example of a work machine that may benefit from the present invention. Other types of work machines (including work vehicles) may include without limitation such work machines for use in industrial, construction, maintenance, repair, emergency, and other such applications, where the work machines may have multiple actuation functions, such as lifting arms, booms, buckets, as well as various other auxiliary functions.

Figure 2:
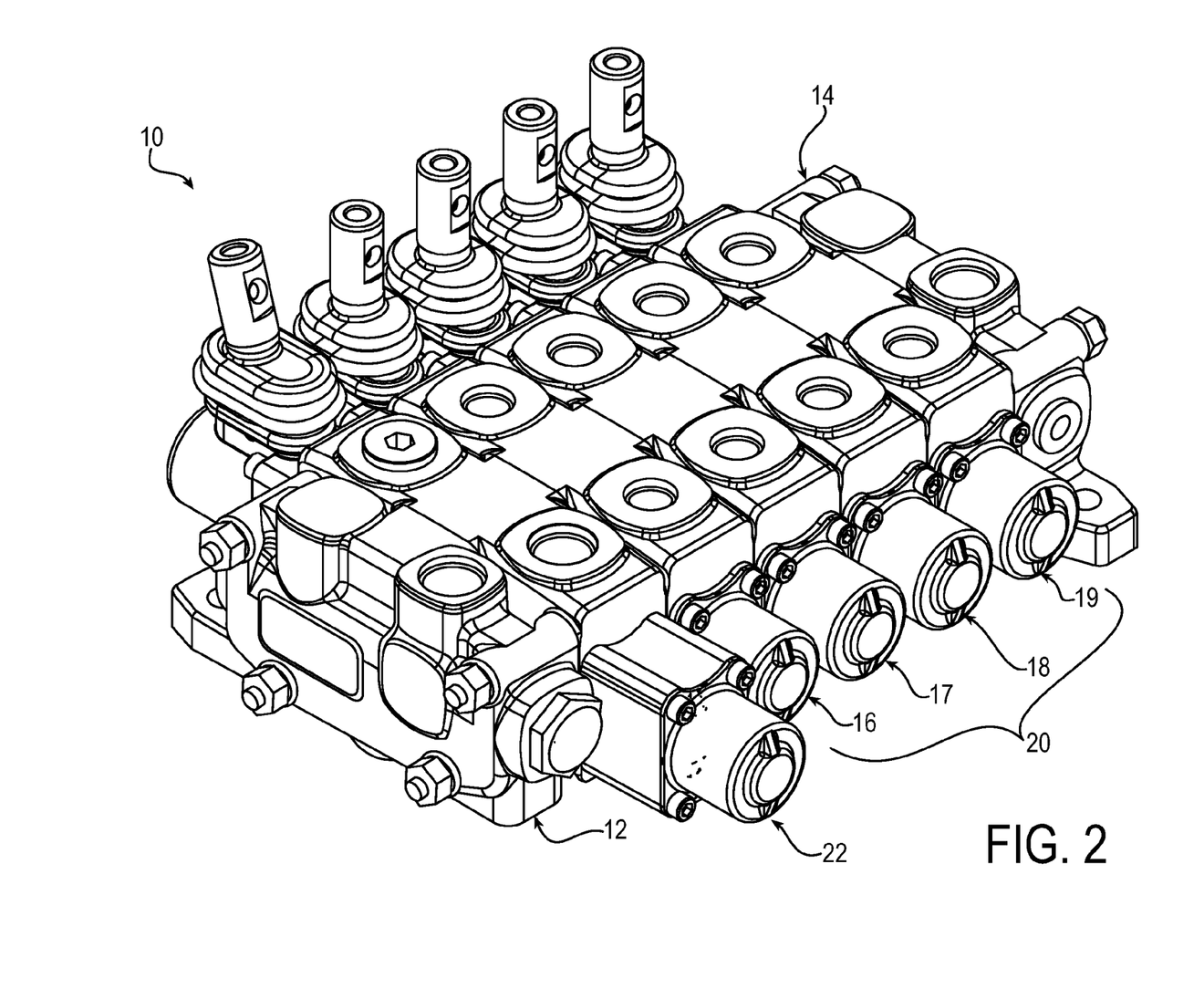
FIG. 2 is a perspective view of an exemplary assembly of valve sections including an exemplary selector control valve assembly according to an embodiment of the invention.

Turning to FIG. 2, a perspective view of an exemplary assembly of valve sections 10 according to one embodiment is shown. In the illustrated embodiment, the valve section assembly 10 includes individual sections that are coupled together by bolts or other attachment in a known manner to provide an integral assembly. As used herein, the term integral assembly means of a single piece construction or of a multi-piece construction assembled such that the multiple pieces function as a single piece without external fluid hoses or other external fluid pressure lines.

Generally, the sections of the valve section assembly 10 may include an inlet section 12 adjacent a first end of the assembly of valve sections 10 and an outlet section 14 adjacent a second, opposite, end of the valve section assembly 10. The exemplary valve section assembly 10 may also include one or more working valve sections 16, 17, 18, 19 that are interposed between the inlet section 12 and the outlet section 14. The working valve sections 16, 17, 18, 19 may together form a primary working valve assembly 20, or primary control, which may be used to control one or more functions of a boom, for example. In this manner, the primary working valve assembly 20 may correspond with the primary working control 6 shown in FIG. 1. Each of the working sections 16, 17, 18, 19 may include a main flow control valve that is manually operable by applying a user input to a lever or joystick to control one or more functions of the boom, such as tilting, rotating, extending, lowering, or raising the boom.

As shown, the valve section assembly 10 also includes an exemplary selector control valve assembly 22 interposed between the inlet section 12 and the primary working valve assembly 20. The selector control valve assembly 22 is configured to enable activation or deactivation of the primary control valve assembly 20 and/or a secondary control valve assembly 24 (or secondary control, shown schematically in FIG. 3). In this manner, the selector control valve assembly 22 may correspond with the selector control 9 shown in FIG. 1. In exemplary embodiments the selector control valve assembly 22 is an integral part of the valve section assembly 10 adjacent to the primary control 20, which may enable simultaneous operation of both the selector control valve assembly 22 and the primary control valve assembly 20. However, it is also understood that the selector control valve assembly 22 could be separate and apart from the primary working valve assembly 20 depending on the system requirements, as would be appreciated by those having skill in the art.

Figure 3:
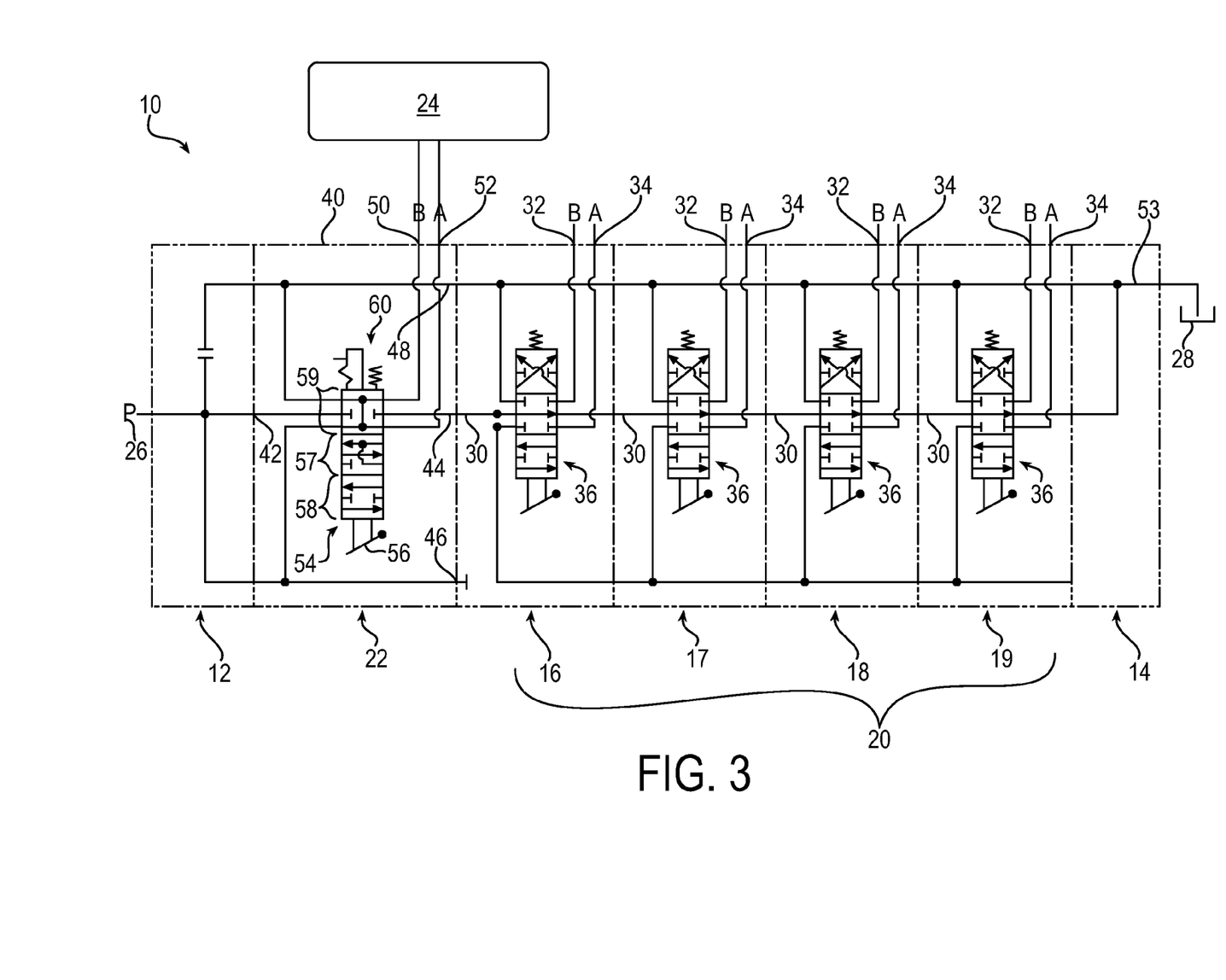
FIG. 3 is an exemplary hydraulic circuit diagram including a schematic depiction of the valve section assembly in FIG. 2.

Turning to FIG. 3, a schematic hydraulic circuit diagram showing an exemplary configuration of a hydraulic system including the assembly of valve sections 10 is shown. The hydraulic system includes a fluid flow source 26 (or fluid pressure source), such as a pump, that provides flow of pressurized fluid (e.g., hydraulic fluid) to the inlet section 12. The outlet section 14 may receive fluid flow from any of the sections 14, 22, 16, 17, 18, 19, and the outlet section 14 may have an outlet passage that enables the fluid to exit the assembly 10 to a reservoir 28.

Generally, each working valve assembly section 16, 17, 18, 19 of the primary control assembly 20 may have a valve body (shown schematically as an envelope border), a fluid inlet passage 30, one or more outlet passages or work ports 32 and 34, and a fluid flow path fluidly connecting the inlet passage 30 and/or the one or more work ports 32, 34. It is understood that the one or more working valve sections 16, 17, 18, 19 may be configured substantially the same as one another (as shown in the illustrated embodiment), or the working sections may be different from one another, and any number of the same or different working sections may be included in the assembly of valve sections depending on the system requirements.

In a known manner, each working valve section 16, 17, 18, 19 of the primary control valve assembly 20 may include a main control valve 36 configured to control fluid flow and pressure from the inlet passage 30 to the one or more work ports 32, 34. The work ports 32, 34 may be fluidly connected to one or more associated hydraulic fluid receiving devices of the machinery to be controlled. The hydraulic fluid receiving devices may include one or more hydraulic storage devices such as tanks or accumulators, hydraulic linear or rotary actuators, such as hydraulic cylinders, rotary motors, such as gerotor or gear motors, other hydraulic valves or subsystems, and/or any other devices that receive hydraulic fluid. In exemplary embodiments the primary control valve assembly 20 is disposed at a proximal end of a boom, such as within a bed of a vehicle carrying the boom, and the work ports 32, 34 are fluidly connected to actuators or other fluid receiving devices for enabling operation of the boom from ground level.

The secondary control valve assembly 24 may be constructed substantially the same as or similar to the primary control valve assembly 20. As shown in the schematic illustration, the secondary control valve assembly 24 may be remote from the primary control valve assembly 20. In exemplary embodiments the secondary control valve assembly 24 is disposed at a distal end of a boom, such as within a bucket supported by the boom, which enables operation of the boom from an elevated position. In this manner, the secondary control valve assembly 24 may correspond with the secondary working control 8 shown in FIG. 1.

The selector control valve assembly 22 may have a valve body 40 (shown schematically as an envelope border), a fluid inlet passage 42, one or more outlet passages 44, 46, 48, including work ports 50 and 52, and a fluid flow path fluidly connecting the inlet passage 42 and/or the one or more outlet passages 44, 46, 48, 50, 52. As shown, the outlet passage 44 of the selector control valve assembly 22 may be fluidly connected to the inlet 30 of the primary control valve assembly 20, and the outlet passage(s) 50 and/or 52 may be fluidly connected to the secondary control valve assembly 24. In addition, the outlet passage 48 may be fluidly connected to a fluid return line 53 that is connected to the reservoir 28.

The selector control valve assembly 22 may also include a main control valve 54 that is manually operable by a lever 56 for directing fluid flow based on a position of the main control valve 54 within the valve body 40. As shown, the main control valve 54 is a three-position, four-way valve that may enable three states of operation of the selector control 22. For example, in the exemplary embodiment the main control valve 54 may be shifted to a first position 57 representing a first state in which the selector control 22 fluidly couples the primary control 20 with the fluid flow source 26 via outlet passage 44, and decouples the secondary control 24 from the fluid flow source 26. The main control valve 54 also may be shifted to a second position 58 representing a second state in which the selector control 22 fluidly couples the secondary control 24 with the fluid flow source 26 via work port 50 and/or 52, and in which the primary control 20 is decoupled from the fluid flow source 26. The main control valve 54 also may shift to a third position 59, or failsafe position, representing a failsafe state in which the selector control 22 directs fluid flow to the fluid return line 53 via outlet passage 48, such that both the primary control 20 and the secondary control 24 are decoupled from the fluid flow source 26, thereby preventing operation of the boom or other such machinery. It is understood that although a three-position, four-way valve is shown, other embodiments may include more or fewer positions or paths depending on the application, as understood by those having skill in the art. For example, in other embodiments, the main control valve may be a three-position, three-way valve in which one of the workports is blocked.

The selector control valve assembly 22 also includes a selector mechanism 60, or valve positioning assembly, that is operatively coupled to the main control valve 54. The selector mechanism 60 may be configured to maintain the above-described second state for activating the secondary control 24 independent of continuous user input being applied to the selector control 22. For example, where the secondary control valve assembly 24 is disposed at the distal end of a boom, for example, the operator on the ground may selectively activate the secondary control 24 by manually shifting the main control valve 54 to the second position 58 so as to allow a worker in the elevated bucket to control the boom with the secondary control 24 independent of input from the operator on the ground.

The selector mechanism 60 also may be configured to maintain the above-described first state for activating the primary control 20 when continuous external input is applied to the selector control 22. For example, in the example of operating a boom, the operator on the ground may activate the primary control 20 by manually shifting the main control valve 54 to the first position 57 so as to allow the operator on the ground to control the boom with the primary control 20 only while the operator is operatively holding the main control valve 54 and maintaining the selector control 22 in the first state.

The selector mechanism 60 is further configured to normally bias the selector control 22 toward the failsafe state so as to automatically decouple the primary control 20 and secondary control 24 when the operator discontinues applying the user input to the selector control 22 for maintaining the first state. For example, in the example of operating a boom, where the operator on the ground stops holding the main control valve 54 of the selector control 22 in the first positon 57, the selector mechanism 60 is configured to automatically shift the main control valve 54 to the failsafe position 59. Such a configuration of the selector control 22 to automatically select the failsafe state in this way improves the operation of the boom by ensuring that the operator actively selects and continuously maintains the selector control 22 in the first state before being able to control the boom with the primary control 20. This helps to prevent the primary control 20 from being accidentally activated and engaged, which otherwise could interfere with a worker in the bucket at the distal end of the boom.

It is understood that the hydraulic system exemplified in FIG. 3 is provided for illustration purposes to show some of the possible options with exemplary valve assemblies or work sections. It is further understood that the illustrated system may not necessarily be used, as illustrated, for any particular job or on any particular hydraulic machine. For example, in other exemplary embodiments, less than four work sections are utilized. In other embodiments, more than four work sections are utilized. In one example, only one exemplary work section may be provided, while in another, every hydraulic function of a boom, for example, may have an associated exemplary work section.

Figure 4:
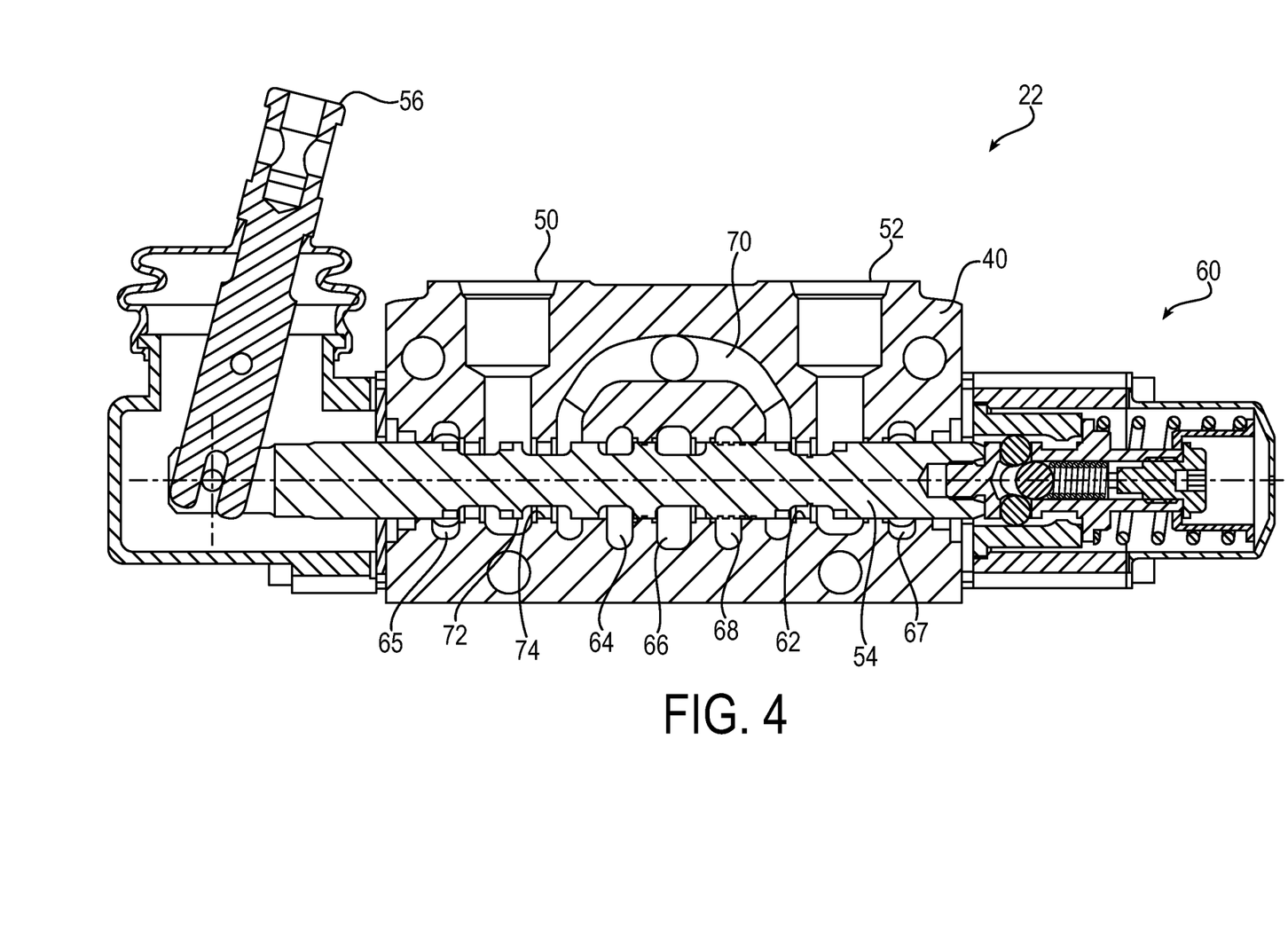
FIG. 4 is a cross-sectional view of the selector control valve assembly in FIG. 2, including an exemplary selector mechanism.

Turning to FIG. 4, a cross-sectional view of an exemplary embodiment of the selector control valve section 22 is shown. In the illustrated embodiment, the valve body 40 is a unitary valve body having a fluid flow path for enabling fluid to flow to the primary working valve assembly 20, the secondary working valve assembly 24, or the fluid return line 53 (shown in FIG. 3). As shown, the main control valve 54 may be configured as a valve spool slidably disposed within a spool bore 62 of the valve housing 40. One or more flow passages 64, 65, 66, 67, 68 and/or the work ports 50, 52 may be fluidly connected to the spool bore 62. A bridge passage 70 also may be provided to fluidly connect to the spool bore 62 on opposite sides of the one or more passages 64, 66, 68.

The main control valve 54 may be configured to extend through at least a portion of the valve body 40 and may be movable in the fluid flow path relative to the valve body for directing fluid flow based on a position of the main control valve within the valve body. The main control valve 54 may have a plurality of spool lands (e.g., 72) configured to cooperate with corresponding valve body lands (e.g., 74) for selectively directing fluid flow through the flow passages and/or work ports of the valve body. As shown, the main control valve 54 is operably connected to the lever 56 and may be manually movable by applying a user input to select a working position, such as the previously described first position or second position.

Figure 5:
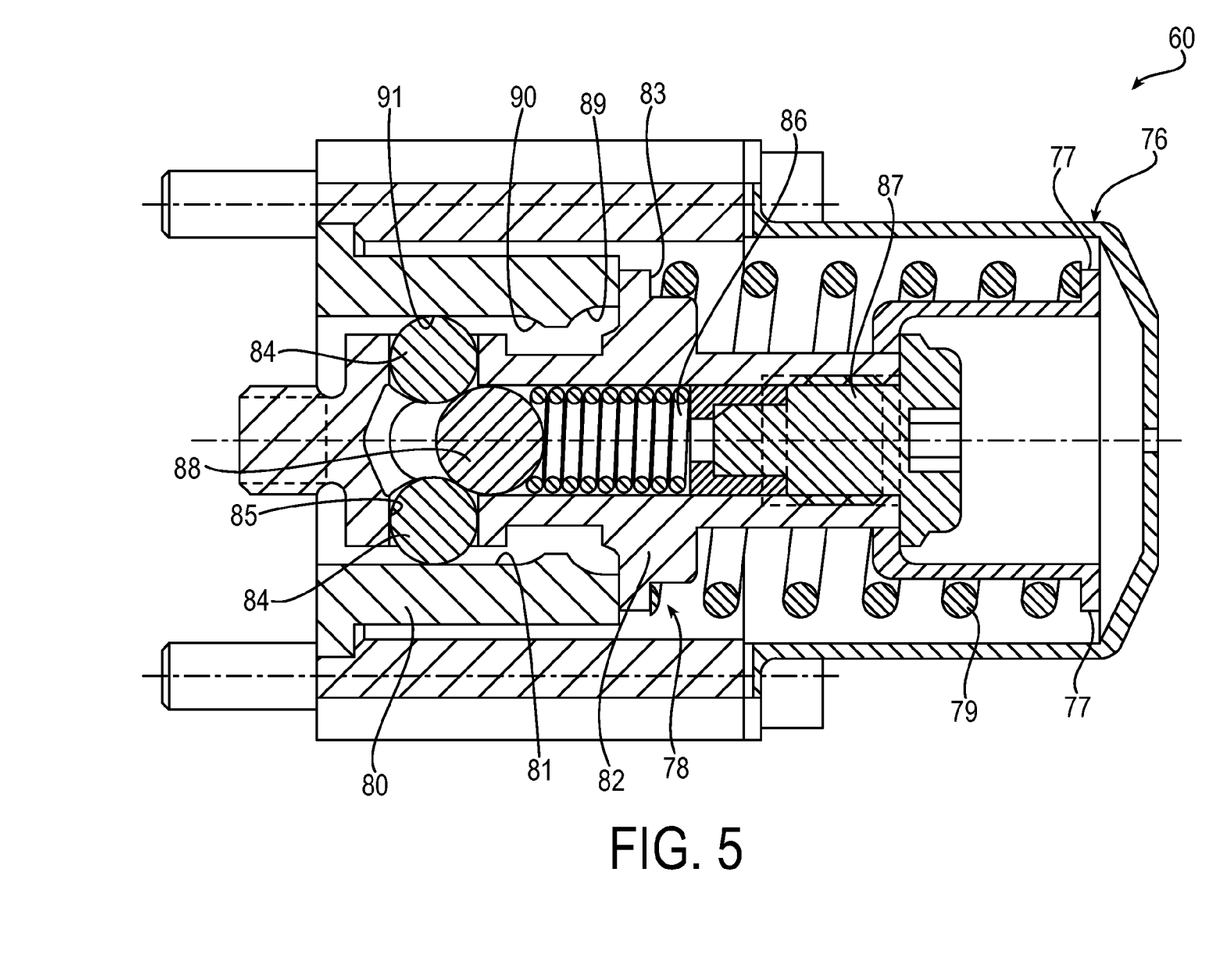
FIG. 5 is an enlarged cross-sectional view of the selector mechanism in
FIG. 4.

Referring to FIGS. 4 and 5, the above-described selector mechanism 60 may be attached to the side of the valve body 40, for example toward an axial end of the main control valve 54. The selector mechanism 60 may include a bonnet assembly 76, or protective cap, that encloses a detent mechanism 78 and a main biasing spring 79.

The detent mechanism 78 may include a detent sleeve 80 having a radially inner surface 81 that forms an internal bore, and a detent holder 82 configured to be slidably movable in the internal bore. The detent holder 82 may be operatively coupled to an axial end portion of the main control valve 54 for common movement therewith. The detent holder may have a radial shoulder 83 that engages the main biasing spring 79 for enabling the detent holder 82 and main valve 54 to shift in response to the spring force of the main spring 79. In the exemplary embodiment, the main biasing spring 79 is retained by a spring collar 77, and the main spring is configured to urge the detent holder 82 inwardly toward the valve body 40.

The detent holder 82 may also include one or more detent members 84, such as spherical detent balls. The detent members 84 may be disposed within channels 85 of the detent holder for enabling the detent members 84 to be carried by the detent holder 82 during sliding movement within the detent sleeve 80. The detent holder 82 may define an internal bore that contains a detent biasing spring 86, which may be contained by a spring collar 87. The biasing spring 86 may be configured to urge a cam 88, such as a camming ball or cone-shaped poppet, against the one or more detent members 84 for urging the detent members 84 radially outwardly toward the detent sleeve 80.

The radially inner surface 81 of the detent sleeve may be configured to define at least one detent groove 89 that is configured to receive the one or more detent members 84. The detent groove 89 may be configured to secure the detent members 84 such that the spring force of the main spring 79 is insufficient to allow the detent members 84 to be extracted from the detent groove 89 without additional external input from the user. In this manner, it is understood that the term detent groove as used herein may include any indentation, ridge, recess, radial notch, or other such structure that is configured to retain the detent member. In exemplary embodiments, such a detent position in which the detent members 84 are securably received in the detent groove 89 may correspond with the main control valve 54 being shifted to the second position, in which the secondary control valve assembly 24 may be activated to allow a remote worker to control the functions of the boom, for example, independently of input from the operator on the ground.

The radially inner surface 81 of the detent sleeve also may be configured to define an abutment surface 90 which may be interposed between the detent groove 89 and a position along the detent sleeve 80 that corresponds to the failsafe position. The abutment surface 90 may be configured to engage the one or more detent members 84 as the main control valve 54 is moved between the failsafe position and the first position so that the user may sense or feel this engagement. In exemplary embodiments, such a feel position in which the detent members 84 engage the abutment surface 90 corresponds with the main control valve 54 being shifted to the first position. In this manner, the operator may feel when the main control valve 54 has been shifted to the first position so as to alert the operator that the primary controls 20 are activated. It is understood that the term abutment surface as used herein may include any ridge, bulge, protuberance, notch, or other such structure that is configured to provide an alert the user. In addition, although such a feel position may be provided by the abutment surface, it is understood that such a feel position may also be provided by a stop, such as a collar or a stroke limit of the main spool, or other such means that alert the user that the first state has been selected.

As shown, the main biasing spring 79 biases the detent holder 82 away from the abutment surface 90 toward a position 91 along the detent sleeve 80 corresponding with the main valve 54 being shifted to the failsafe position. In exemplary embodiments, the radially inner surface 81 of the detent sleeve is essentially uniform and/or free of abutments or recesses between the sleeve position 91 and the abutment surface 90, which enables the detent holder 82 and main control valve 54 to freely move automatically toward the failsafe position when the operator discontinues applying user input to maintain the first position.

Figure 6A:
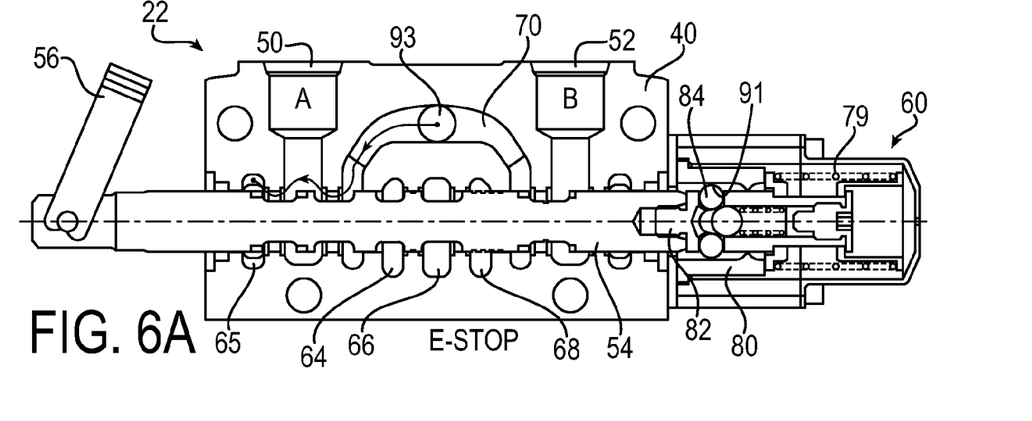
FIGS. 6A-6C are cross-sectional views of the selector control valve assembly in FIG. 4 at various states of operation.
Figure 6B:
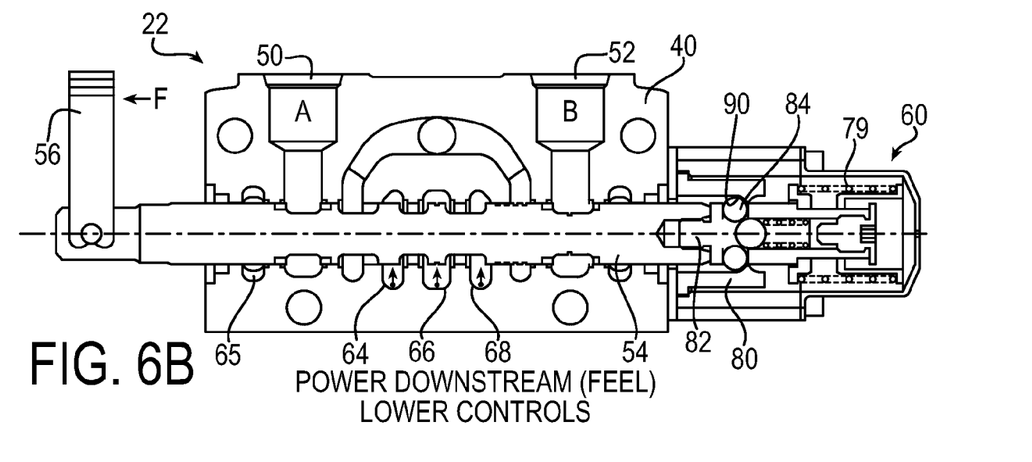
Figure 6C:
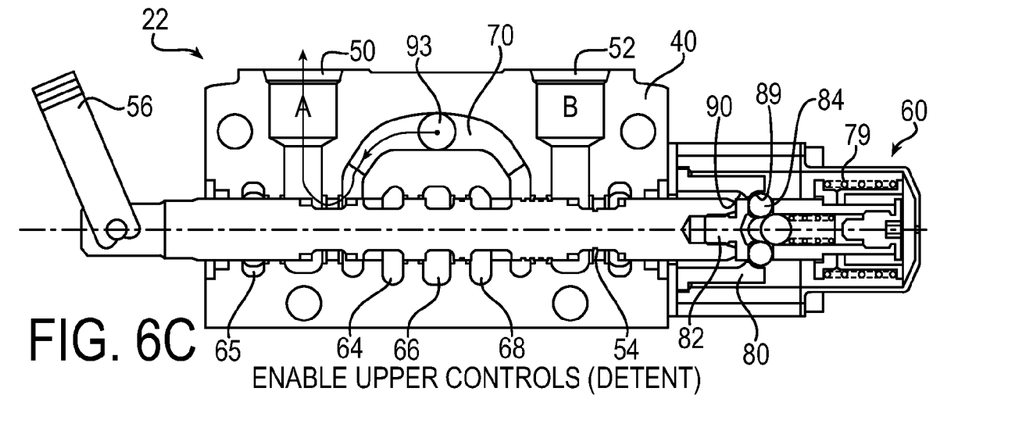

Turning to FIGS. 6A-6C, an exemplary operation of the selector control valve assembly 22 will now be discussed. Referring to FIG. 6A, the selector control valve assembly 22 is shown in a failsafe state in which both the primary control 20 and the secondary control 24 are decoupled from the fluid flow source 26 (shown schematically in FIG. 3). In the illustrated state, the operator or user is not applying an external or user input to the lever 56, and the main spring 79 of the selector mechanism 60 biases the detent holder 82 fixed to the main valve 54 toward the failsafe position. In this failsafe state, fluid may flow from the fluid flow source 26 via the inlet section 12 (shown in FIG. 3) to an inlet passage 93 fluidly coupled to the bridge passage 70 of the selector valve body 40. The main control valve 54 being in its failsafe position blocks fluid flow to the outlet passages 64, 66, 68 and opens a flow path (shown with arrows) to the outlet passage 65 which is fluidly connected to fluid return line 53 connected to tank or reservoir 28 (shown in FIG. 3).

Referring to FIG. 6B, the selector control valve assembly 22 is shown in a first state in which the primary control 20 is fluidly coupled to the fluid flow source 26 (shown in FIG. 3), which thereby enables operation of the boom, for example, with the primary control 20. Going from FIG. 6A to FIG. 6B, the operator applies a user input (F) to the lever 56 to move the main control valve 54 from the failsafe position to the first position. As the main control valve 54 moves toward the first position, the detent holder 82 fixed to the main valve 54 carries the detent members 84 along the detent sleeve 80 until the detent members 84 engage the abutment surface 90. The operator may feel the resistance of the detent members 84 engaging the abutment surface 90, which alerts the user that the main valve 54 is in the first position.

In this first position, fluid may flow from the fluid flow source 26 via the inlet section 12 (shown in FIG. 3) and through the passages 64, 66 and/or 68 downstream to one or more of the working sections 16, 17, 18, 19 of the primary control 20 (shown in FIG. 3). The main control valve 54 in this first position may block fluid flow to the outlet passage 65 and the work ports 50, 52. In the exemplary embodiment, the main control valve 54 is maintained in the first position as long as the operator continues to apply input to the lever 56 to maintain the position of the main valve 54. In this manner, the operator is capable of continuously applying such input with one hand to maintain the first state for enabling operation of the primary control 20, while using the other hand to apply input to the primary control to operate one or more functions of the boom, for example. If the operator were to release the lever 56 and discontinue such input to maintain the first position, then the main spring 79 of the selector mechanism 60 would automatically shift the main control valve 54 to the failsafe position, as illustrated in FIG. 6A.

Referring to FIG. 6C, the selector control valve assembly 22 is shown in a second state in which the secondary control 24 is fluidly coupled to the fluid flow source 26 (shown in FIG. 3), which thereby enables operation of the boom, for example, with the secondary control 24. Going from FIG. 6B to FIG. 6C, the operator may apply a user input to the lever 56 to move the main control valve 54 from the first position to the second position. As the main control valve 54 moves toward the second position, the detent holder 82 fixed to the main valve 54 carries the detent members 84 over the abutment surface 90 until the detent members 84 are received in the detent groove 89 which alerts the user that the main valve 54 is in the second position. In this second position, fluid may flow from the fluid flow source 26 via the inlet section 12 (shown in FIG. 3) to the inlet passage 93. The main control valve 54 being in the second position may block fluid flow to outlet passages 64, 66, 68 and 65, and may open a flow path (shown with arrows) to the work port 50 which is fluidly connected to the secondary control valve 24 (shown schematically in FIG. 3).

As discussed above, when the main control valve 54 has been shifted to the second position, the detent members 84 may be received in the detent groove 89, and the detent groove 89 may be configured to secure the detent members 84 such that the spring force of the main spring 79 is insufficient to allow the detent members 84 to be extracted from the detent groove 89 without additional input from the user. In this manner, the user may release the lever 56 when the main valve 54 has been shifted to the second position so as to maintain the second operational state of the selector control 22 independent of continuous input from the operator. This may allow a worker in an elevated bucket to control the boom, for example, with the secondary control 24 independent of input from the operator on the ground. In addition, if the operator on the ground applied an input to exit the second position (e.g., applied sufficient force enabling the detent members 84 to be extracted or disengaged from the detent groove 89), then the selector mechanism 60 would automatically shift the main control valve 54 to the failsafe position (as illustrated in FIG. 6A) when the operator discontinued such input after exiting the second position.

Figure 7:
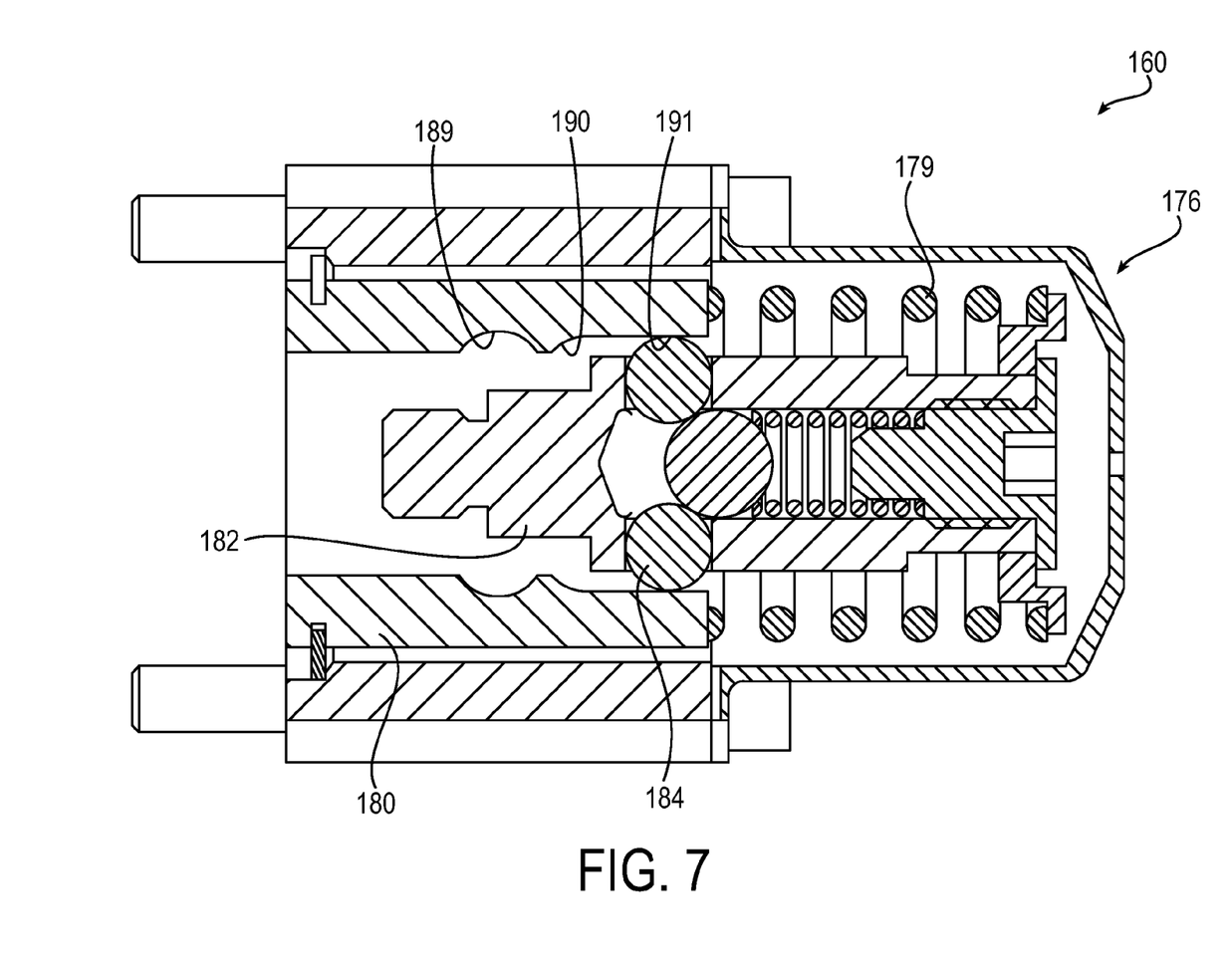
FIG. 7 is another exemplary selector mechanism according to an embodiment of the invention.

Turning to FIG. 7, another exemplary embodiment of a selector mechanism 160 is shown. The selector mechanism 160 is substantially similar to the above-referenced selector mechanism 60, and consequently the same reference numerals but indexed by 100 are used to denote structures corresponding to similar structures. In addition, the foregoing description of the selector mechanism 60 is equally applicable to the selector mechanism 160 except as understood by the description below. It is also understood that aspects of the selector mechanisms 60, 160 may be substituted for one another or used in conjunction with one another where applicable.

As shown in the exemplary embodiment, the selector mechanism 160 is essentially configured in reverse of the selector mechanism 60. The selector mechanism 160 may be attached to the side of a selector control valve body similarly to the selector mechanism 60, however, with the selector mechanism 160, the main biasing spring 179 is configured to bias the detent holder 182 outwardly away from the valve body. As such, the configuration of the selector mechanism 160 would cause the main control valve to be shifted further to the right when compared to the main control valve 54 shown in FIG. 3, and the main control valve used with the selector mechanism 160 also may be configured essentially in reverse of the main control valve 54 to direct flow as desired, as would be understood by those with skill in the art.

In the illustrated embodiment, the selector mechanism 160 normally biases the detent holder 182 and detent mechanisms 184 toward position 191 along the detent sleeve 180, which corresponds with the failsafe position. The operator would then operatively shift the main control valve toward the left to engage the abutment surface 190 so as to alert the user that the main valve is in the first position. If the operator discontinued such input for maintaining the first position, the holder 182 fixed to the main control valve would shift back to the failsafe position. The operator could further operatively shift the main control valve toward the left such that the detent members 184 would be securably received in the detent groove 189 to maintain the main control valve in this position, which corresponds with the second operative position. In addition, if the operator applied an input to exit the second position (e.g., applied sufficient force to extract or disengage the detent members from the detent groove), then the selector mechanism 160 could automatically shift the main control valve 54 to the failsafe position when the operator discontinued such input after exiting the second position.

Figure 8:
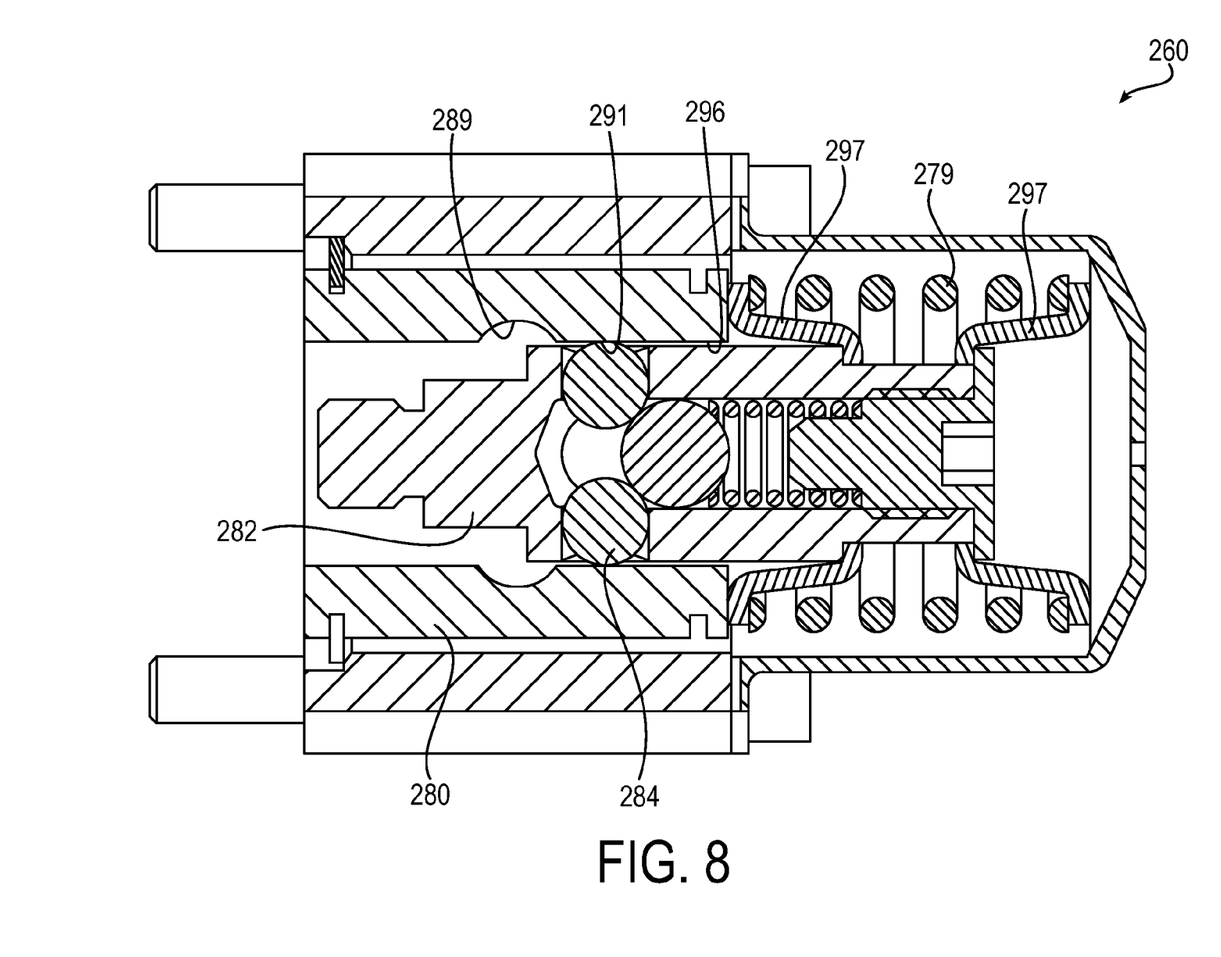
FIG. 8 is another exemplary selector mechanism according to an embodiment of the invention.

Turning to FIG. 8, another exemplary embodiment of a selector mechanism 260 is shown. The selector mechanism 260 is substantially similar to the above-referenced selector mechanism 60, and consequently the same reference numerals but indexed by 200 are used to denote structures corresponding to similar structures. In addition, the foregoing description of the selector mechanism 60 is equally applicable to the selector mechanism 260 except as understood by the description below. It is also understood that aspects of the selector mechanisms 60, 260 may be substituted for one another or used in conjunction with one another where applicable.

As shown in the exemplary embodiment, the selector mechanism 260 is configured such that the main biasing spring 279 biases the detent holder 282 toward a center position 291 within the detent sleeve 270, which corresponds to the failsafe position. The operator would then operatively shift the main control valve toward the right to a stop position 296 in which the main spring 279 becomes fully compressed, or in which the spring collars 297 are engaged, so as to provide the operator with the feeling that the main control valve is in the first position. If the operator discontinued such input for maintaining the first position, which corresponds to position 296, then the holder 282 fixed to the main control valve would shift back toward the left to the failsafe position. The operator could further operatively shift the main control valve toward the left such that the detent members 284 would be securably received in the detent groove 289 to maintain the main control valve in this position, which corresponds with the second operative position. In addition, if the operator applied an input to exit the second position (e.g., applied sufficient force to extract or disengage the detent members from the detent groove), then the selector mechanism 260 could automatically shift the main control valve to the failsafe position when the operator discontinued such input after exiting the second position.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic system comprising:
a fluid flow source;
a primary control;
a secondary control; and
a selector control that is operable by a user for selectively fluidly coupling the fluid flow source with the primary control or the secondary control, the selector control comprising:
a first state for selectively fluidly coupling the primary control with the fluid flow source and decoupling the secondary control from the fluid flow source;
a second state for selectively fluidly coupling the secondary control with the fluid flow source and decoupling the primary control from the fluid flow source; and
a failsafe state for decoupling both the primary control and the secondary control from the fluid flow source;
wherein the selector control is manually operable by applying a user input to select the first state or the second state, the selector control being configured to maintain the second state independent of continuous user input being applied to the selector control, and configured to maintain the first state when continuous user input is applied to the selector control;

wherein the selector control is normally biased toward the failsafe state such that the selector control automatically selects the failsafe state when the user discontinues applying the user input for maintaining the first state;

wherein the selector control is a selector control valve assembly, the primary control is a primary working valve assembly, and the secondary control is a secondary working valve assembly, wherein the selector control valve assembly comprises:
a valve body having a fluid flow path for enabling fluid to flow to the primary working valve assembly, the secondary working valve assembly, or a fluid return line;
a main control valve extending through at least a portion of the valve body and being manually movable in the fluid flow path relative to the valve body for directing fluid flow based on a position of the main control valve within the valve body;

wherein the first state corresponds to a first position of the main control valve for directing fluid flow to the primary working valve assembly;

wherein the second state corresponds to a second position of the main control valve for directing fluid flow to the secondary working valve assembly; and wherein the failsafe state corresponds to a failsafe position of the main control valve for directing fluid flow to the fluid return line.

2. The hydraulic system according to claim 1, wherein the secondary control is remote from the primary control.

3. The hydraulic system according to claim 1, wherein the secondary control is disposed at a distal end of a boom, and the primary control is disposed at a proximal end of the boom, the primary and secondary controls being coupleable to the fluid flow source to control one or more functions of the boom.

4. The hydraulic system according to claim 3, wherein the selector control is disposed proximal the primary control, such that the user is capable of continuously applying an input to the selector control with one hand to maintain the first state for enabling operation of the primary control, and the user is capable of applying an input to the primary control with the other hand to control one or more functions of the boom.

5. The hydraulic system according to claim 1, wherein the selector control is normally biased toward the failsafe state such that the selector control automatically selects the failsafe state only when the user applies an input to exit the second state.

6. The hydraulic system according to claim 1,
wherein the selector control valve assembly further comprises a selector mechanism operatively coupled to the main control valve, the selector mechanism being configured to maintain the main control valve in the second position independent of the user continuously applying user input to the main control valve, and being configured to maintain the first position when the user continuously applies user input to the main control valve; and
wherein the selector mechanism is configured to bias the main control valve toward the failsafe position such that the main control valve automatically moves to the failsafe position when the user discontinues applying the user input to maintain the first position.

7. A selector control valve assembly that is operable by a user for selectively directing pressurized fluid to a primary working valve assembly, a secondary working valve assembly, or a fluid return line, the selector control valve assembly comprising:
a valve body having a fluid flow path for enabling fluid to flow to the primary working valve assembly, the secondary working valve assembly, or the fluid return line;
a main control valve extending through at least a portion of the valve body and being movable in the fluid flow path relative to the valve body for directing fluid flow based on a position of the main control valve within the valve body, the main control valve being manually movable by applying a user input to select a first position for directing fluid flow to the primary working valve assembly, or to select a second position for directing fluid flow to the secondary working valve assembly; and
a selector mechanism operatively coupled to the main control valve, the selector mechanism being configured to maintain the main control valve in the second position independent of the user continuously applying user input to the main control valve, and being configured to maintain the first position when the user continuously applies user input to the main control valve;
wherein the selector mechanism is configured to bias the main control valve toward a failsafe position for directing fluid flow to the fluid return line and decoupling both the primary and secondary working valve assemblies, the selector mechanism being configured to automatically move the main control valve to the failsafe position when the user discontinues applying the user input to maintain the first position.

8. The selector control according to claim 7, wherein the selector mechanism is configured to bias the main control valve toward the failsafe position such that the main control valve automatically moves to the failsafe position when the user applies an input to disengage from the second position.

9. The selector control valve assembly according to claim 7, wherein the selector mechanism includes a detent mechanism, the detent mechanism including a detent sleeve having at least one detent groove, the at least one detent groove being configured to receive a corresponding detent member.

10. The selector control valve assembly according to claim 9, wherein the at least one detent groove includes a first detent groove, and
wherein the detent mechanism is configured to maintain the main control valve in the second position when the detent member is received in the first detent groove.

11. The selector control valve assembly according to claim 9, wherein the detent sleeve includes an abutment surface configured to engage the detent member when the main control valve is in the first position, the abutment surface being configured to enable the user to sense the main control valve being positioned in the first position.

12. The selector control valve assembly according to claim 11, wherein the abutment surface is interposed between the at least one detent groove corresponding to the second position and a position along the detent sleeve corresponding to the failsafe position.

13. The selector control valve assembly according to claim 12, wherein the detent sleeve does not have a detent groove interposed between the abutment surface and the position along the detent sleeve corresponding to the failsafe position for enabling the main control valve to move freely to the failsafe position.

14. The selector control valve assembly according to claim 11, wherein the detent sleeve has a radially inner surface forming an internal bore, and wherein the radially inner surface defines the at least one detent groove and the abutment surface within the internal bore.

15. The selector control valve assembly according to claim 14, wherein the detent mechanism includes a detent holder slidably movable in the internal bore.

16. The selector control valve assembly according to claim 15, wherein the detent holder is operatively connected to an axial end of the main control valve for common movement therewith.

17. The selector control valve assembly according to claim 15, wherein the detent holder includes a detent biasing member and a cam, wherein the detent biasing member is configured to urge the cam against the detent member for urging the detent member radially outwardly toward the sleeve inner surface.

18. The selector control valve assembly according to claim 7, wherein the selector mechanism further includes a main biasing spring configured to bias the main control valve toward the failsafe position.

19. A selector control valve assembly for selectively directing pressurized fluid to at least one working valve assembly, the selector control valve assembly comprising:
a valve body having a fluid flow path for enabling fluid to flow to the at least one working valve assembly;
a main control valve extending through at least a portion of the valve body and being movable in the fluid flow path relative to the valve body for directing fluid flow based on a position of the main control valve within the valve body, the main control valve being operable to select a working position for directing fluid flow to the at least one working valve assembly; and
a selector mechanism operatively coupled to the main control valve, the selector mechanism including a detent sleeve having at least one detent groove that is configured to securably receive a detent member when the main control valve is in the working position;
wherein the selector mechanism includes a biasing device configured to move the main control valve toward a failsafe position for decoupling the at least one working valve assembly from fluid flow when the detent member is not securably received in the detent groove.

\* \* \* \* \*